United States Patent Office 2,859,099
Patented Nov. 4, 1958

2,859,099

PROCESS FOR THE SEPARATION OF COLUMBIUM AND TANTALUM VALUES

John R. Ruhoff and George L. Martin, Webster Groves, and Charles O. Gerfen, Brentwood, Mo., assignors to Mallinckrodt Chemical Works, St. Louis, Mo., a corporation of Missouri No Drawing. Application February 15, 1955
Serial No. 488,403

2 Claims. (Cl. 23—23)

This invention relates to a separation process and more particularly to a process for recovering tantalum values from mineral concentrates.

Briefly, the present invention is directed to the method of upgrading tantalum-containing concentrates which comprises adjusting the fluoride ion concentration of a mixture of said tantalum compound and a columbium compound to effect the separation of hydrous tantalum oxide from the mixture.

Among the several objects of this invention may be noted the provision of improved methods for recovering tantalum values from mineral concentrates containing a tantalum compound and a columbium compound; the provision of methods which yield a concentrate of tantalum values in reactive and readily usable form; and the provision of methods for recovering tantalum from such concentrates without the use of expensive chemical reagents. Other objects and features will be in part apparent and in part pointed out hereinafter.

The invention accordingly comprises the methods hereinafter described, the scope of the invention being indicated in the following claims.

Known minerals containing tantalum also contain columbium. However, the chemical methods heretofore available for recovering tantalum values from concentrates containing tantalum values alone or associated with columbium have been inefficient, or required the use of expensive chemical reagents.

In accordance with the present invention, it has now been found that tantalum values can be conveniently and economically recovered from concentrates containing tantalum values alone or associated with compounds of columbium by precipitating the tantalum values from a solution containing tantalum fluocomplex, using the hydrous oxide of columbium as the precipitating agent. The amount of hydrous columbium oxide added to the solution should not substantially exceed that required to displace tantalum from its fluocomplex (including that necessary to react with any free fluoride or impurities which may be displaced by hydrous columbium oxide and which may have been present initially). If compounds of other elements (such as iron) which are displaced by columbium are present, appropriate allowance should be made in the amount of hydrous columbium oxide added. Compounds of such elements can be easily removed from the precipitate by conventional methods.

Hydrous columbium oxide is preferably employed as the precipitating agent although this oxide together with hydrous tantalum oxide may also be used as the precipitating agent. For example, the mixed hydrous oxides of columbium and tantalum may be obtained by precipitation from a solution of the fluocomplexes of these elements by addition of a base, such as ammonia. Thus, the mixed hydrous oxides of columbium and tantalum are suitable for use as the precipitating agent and the presence of the hydrous oxide of tantalum in such a mixture does not interfere with the practice of the invention.

The process of the present invention also includes treating a mixture of the hydrous oxides of tantalum and columbium with sufficient fluoride to form only the fluocomplexes of columbium. In this case, the hydrous oxide of columbium is selectively dissolved from the mixture of hydrous oxides, but the principle for recovering tantalum values is the same as that described above.

In carrying out the present invention, the fluoride ion concentration is adjusted to be equivalent to the amount of columbium present in the mixture. In general, it is preferred that the process be carried out at a pH of 2–6. Columbium is present as $CbOF_5^=$ in solution and the proportion of fluoride ions in the mixture is computed accordingly in determining the equivalent. At a pH above approximately 6, $CbOF_5^=$ is not stable in the absence of a large excess of fluoride which hinders the separation of tantalum from columbium.

The present process can be carried out by the addition of a suitable proportion of hydrous columbium oxide to a solution containing fluocomplex of tantalum. The amount of such hydrous oxide added is determined upon the basis stated in the preceding paragraph. The hydrous columbium oxide added displaces the tantalum values from solution, thereby precipitating hydrous tantalum oxide, the columbium remaining in solution as its fluocomplex.

Alternatively, mixtures containing hydrous oxides of tantalum and columbium may be separated by adding to the mixture a source of fluoride ions, the proportion thereof being determined as outlined above, and adjusting so that the final pH is as stated above. A fluocomplex of columbium is thereby formed which is water soluble and may, therefore, be selectively dissolved from the mixture. It will be noted that, in this instance, the resulting product is of the same character as outlined in the preceding paragraph and is obtained by reason of the same chemical principles.

If any compound of elements of group IV–B of the periodic table is present, this fact will not affect the operation of the process except that appropriate steps should be taken in adjusting the fluoride ion concentration. The fluocomplexes of the group IV–B elements are relatively more stable than the fluocomplexes of columbium and tantalum, and are therefore retained in solution.

It is often advantageous to heat the mixture while carrying out the process so as to increase the solubility of the fluocomplexes and make it possible to work with more concentrated solutions. Also, although alkali metal hydroxides can be used for adjusting the pH of the mixture, ammonia is usually preferred since ammonium salts are more soluble.

The following examples illustrate the invention.

*Example 1*

To an aqueous solution (50 ml.) of the fluocomplex of tantalum containing 40.0 g./liter of fluoride (expressed as $NH_4HF_2$) and 43 g./liter of tantalum (expressed as $Ta_2O_5$) was added hydrous columbium oxide so that the mixture contained 40.0 g./liter of columbium (expressed as $Cb_2O_5$). This mixture contained fluoride equivalent to that required for formation of $(NH_4)_2CbOF_5$. The pH was adjusted to approximately 5.6 with ammonia and the mixture was stirred for one hour. The solid phase then contained 93% of the tantalum and the ratio of tantalum to columbium in this phase was 1.6 to 1.

Example 2

A solution of ammonium bifluoride in water (2.0 g. in 50 ml.) was added to a mixture of the hydrous oxides of tantalum and columbium (equivalent to 2.15 g. $Ta_2O_5$ and 2.0 g. $Cb_2O_5$). The resulting mixture contained fluoride equivalent to that required for formation of $(NH_4)_2CbOF_5$. The pH was adjusted to approximately 5.6 with ammonia, and the mixture was stirred for one hour. The solid phase then contained 98% of the tantalum, and the ratio of tantalum to columbium in this phase was 2.3 to 1.

It will be understood that any convenient source of fluoride ions, such as hydrofluoric acid or one of its water-soluble salts, may be used in the practice of the present invention.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

We claim:

1. The method of recovering tantalum values from a concentrate containing compounds of tantalum and columbium, comprising adding the hydrous oxide of columbium to an aqueous solution of said concentrate containing the fluocomplexes of columbium and tantalum while maintaining the pH at a value between approximately 2–6 to effect precipitation of hydrous tantalum oxide.

2. The method of recovering tantalum values from a concentrate containing compounds of tantalum and columbium, comprising adding the hydrous oxide of columbium to an aqueous solution of said concentrate containing the fluocomplexes of columbium and tantalum in an amount not substantially in excess of that required to decompose the tantalum fluocomplex to effect the precipitation of hydrous tantalum oxide, the pH of the solution being maintained at a value between approximately 2–6.

References Cited in the file of this patent

UNITED STATES PATENTS 1,802,242     Finck et al. _____ Apr. 21, 1931

OTHER REFERENCES

Chem. Abs. 23, 4640 (1929).
Chem. Abs. 41, 4733 and 4734 (1947).
Jour. of the Chem. Soc. (April 1952), pages 1497–1504.
Chem. Abs. 49, 1461 (February 10, 1955).